United States Patent
Measor

(10) Patent No.: US 6,977,981 B2
(45) Date of Patent: Dec. 20, 2005

(54) METHOD AND APPARATUS FOR REDUCING POWER REQUIREMENTS IN A MULTI GIGABIT PARALLEL TO SERIAL CONVERTER

(75) Inventor: Grahame Christopher Measor, Scotts Valley, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 905 days.

(21) Appl. No.: 09/791,187

(22) Filed: Feb. 22, 2001

(65) Prior Publication Data

US 2001/0007577 A1 Jul. 12, 2001

Related U.S. Application Data

(63) Continuation-in-part of application No. 09/376,148, filed on Aug. 17, 1999, now Pat. No. 6,233,294.

(51) Int. Cl.[7] .............................................. H04L 7/04
(52) U.S. Cl. ........................................ 375/362; 370/537
(58) Field of Search ................................ 375/356, 316, 375/260, 286, 349; 370/436, 518, 53.7; 317/3, 410, 407; 34/95; 709/209; 710/69, 71, 51, 52

(56) References Cited

U.S. PATENT DOCUMENTS

| | | | |
|---|---|---|---|
| 4,856,030 A | | 8/1989 | Batzer et al. |
| 5,140,611 A | | 8/1992 | Jones et al. |
| 5,555,548 A | | 9/1996 | Iwai et al. |
| 5,940,456 A | | 8/1999 | Chen et al. |
| 5,955,912 A | * | 9/1999 | Ko .............................. 327/410 |
| 5,963,609 A | | 10/1999 | Huang |
| 6,184,808 B1 | * | 2/2001 | Nakamura .................... 341/95 |
| 6,229,344 B1 | * | 5/2001 | Warwar ......................... 327/3 |
| 6,400,735 B1 | * | 6/2002 | Percey ........................ 370/518 |
| 6,477,186 B1 | * | 11/2002 | Nakura et al. ............... 370/537 |

* cited by examiner

*Primary Examiner*—Young T. Tse
*Assistant Examiner*—Edith Chang
(74) *Attorney, Agent, or Firm*—Kevin J. Daffer; Daffer McDaniel, LLP

(57) ABSTRACT

A variable-mode digital logic circuit is provided for accepting and serializing a parallel data word, so that the parallel data word may be transmitted from the digital logic circuit over a single one-bit wide trace. In some embodiments, the variable-mode digital logic circuit may include a plurality of parallel data traces for receiving the parallel dataword, a plurality of select-capable multiplexor circuits for sequentially activating certain ones of the parallel data traces and for multiplexing the received data into a serial data stream, a ring counter for controlling a frequency of specific operations performed within the circuit, and at least one additional multiplexor circuit array for receiving data output from the plurality of select-capable multiplexor circuits and for further serializing the received data for output on the single one-bit wide trace. The digital logic circuit may be adapted to operate according to one of a plurality of variable modes.

14 Claims, 5 Drawing Sheets

METHOD AND APPARATUS FOR REDUCING POWER REQUIREMENTS IN A MULTI GIGABIT PARALLEL TO SERIAL CONVERTER

CROSS-REFERENCE TO RELATED DOCUMENTS

The present application is a continuation-in-part (CIP) of application Ser. No. 09/376,148 filed Aug. 17, 1999, now U.S. Pat. No. 6,233,294. The instant invention was disclosed in Disclosure Document #487034 filed on Jan. 10, 2001 in the USPTO.

FIELD OF THE INVENTION

The present invention is in the field of parallel to serial data transmission as it applies to computerized semiconductor devices and pertains more particularly to methods and apparatus for reducing power requirements in a multi-gigabit parallel to serial converter circuit.

BACKGROUND OF THE INVENTION

The art of designing and implementing Large Scale Integration (LSI) devices and very large scale integration (VLSI) devices in digital logic has become more complex and sophisticated in recent years. Sophisticated software design tools and automated techniques have replaced prior pencil and paper engineering practices once used to design semiconductor devices. As semiconductor devices have become more complex in terms of circuitry and design, with shrinking device geometry, requirements for data transmission between such devices and on individual ones of such devices has also become more complex and demanding to maintain in operation.

The preferred system for transmitting data between IC devices has long been the system of parallel data transfer. The current method of parallel data transfer incorporates the use of a plurality of separate data-signal transmission paths in parallel. Data passed between two communicating devices travels across a circuit board on a bus, which comprises a plurality of parallel traces or lines. For a 16-bit system, for example, a parallel system would include a separate trace for each bit (16 traces) plus control lines.

Generally speaking, much operational and specification data regarding the manufacture and operation of VLSI and LSI type devices is known and available in the art. Manufacturers of such devices provide exhaustive documentation, and virtually all of such documentation is available to the skilled artisan. Therefore, detailed architectural and functional descriptions of known IC devices are not provided herein. It is enough to say that parallel data must be clocked, synchronized and latched in order to enable successful transmission of the data from a propagating device to a receiving device over a circuit board containing a substantially large number of traces.

Another system for transferring data in general, and also sometimes used for transferring data between IC devices, is the system of serial data transfer. The current method of transferring high-bandwidth serial data between IC devices involves the use of encoding and decoding circuits on each communicating device to manipulate or convert the incoming parallel data, so that it may be transmitted serially across a circuit board from one device to another. For example, a parallel-to-serial data converter in a sending device enables parallel data to be prepared for serial, one-way transmission over a single data line. A decoder circuit in a receiving device decodes the transmitted serial data (using, e.g., a pre-determined decoding scheme), then processes the data. At a given clock speed, serial data transfer is typically slower than parallel data transfer. Therefore, a higher-speed clock is typically used with the serial method to increase the speed with which the serial data is transmitted between devices.

Another problem with current technology is that analog circuitry is typically required in the sending and receiving IC devices to accommodate serial data transfer between the IC devices. Analog circuitry is notoriously more difficult to implement than digital circuitry, and makers of digital IC devices are not anxious to suffer the yield losses attendant on adding analog circuitry to their devices.

Still, even with the known and perceived disadvantages of serial data transmission, the high cost and complexity of parallel data transmission systems is an increasing problem. As computing systems have matured from 4 to 8 to 16 to 32 bit words, and as microprocessors and memories (for example) have become more functional and sophisticated, the number of traces and pins necessary to accomplish adequate transmission has increased dramatically. It is, for example, now common to have plural sets of parallel data transmission pathways serving a single IC device. The high number of traces necessary on a PC board (for example) makes such support systems enormously complex and expensive to design and manufacture. Moreover, every trace demands a separate pin on the IC device. Many devices have more than two hundred pins, and future devices may demand even more. The higher and higher pin count makes such devices more complex to build and increases losses (lower yield) in fabrication.

A serial communication system that may be used between two or more IC devices is described in U.S. Pat. No. 6,233,394 filed Aug. 17, 1999, and referenced above in the Cross-Reference section. The system described in the above-mentioned patent utilizes a separate master chip connected to the sending and receiving IC devices of the serial communication system. In addition, the master chip is described as having a clock generator, and circuitry for affecting serial data transmission and control between the master chip and the IC devices. A slave component is also included on each IC device for transforming data between parallel and serial data formats, and for sending and receiving a serial data stream. The intervening master chip provides a clock signal to each of the slave components for gating serial data communication, and manages all communication between the two slave components. In a preferred embodiment, all circuitry in the slave components is digital circuitry, and all analog circuitry is implemented on the master chip. Also in a preferred embodiment, each slave component periodically checks the phase between the received data and clock streams, and inserts a correction code into the data stream sent back to the master chip, so that the master chip can regularly correct the phase for the clock and data streams sent to each slave.

One challenge in implementing parallel-in-to-serial-out (PISO) converters is that, in order to maintain the desired clock speed of the serial portion of the transmission, the entire converter is typically clocked at the same high speed. This means that considerable power is consumed and cross contamination (jitter) between the traces is more likely to occur at higher levels. The problem increases in chips that process larger bit-size words.

It is desired that extremely high serial clock rates be achieved without requiring maximum power consumption on the processing (PISO) chip. Therefore, what is clearly needed is a method for reducing overall power requirements of a PISO converter, while maintaining a high clock-rate for gating out serial data from a parallel data source.

SUMMARY OF THE INVENTION

In a preferred embodiment of the present invention, a variable-mode digital logic circuit is provided for accepting a parallel data word as input, the parallel data word being a plurality of data bits wide, and serializing the parallel data word, so that the parallel data word may be transmitted as output from the digital logic circuit over a single one-bit wide trace. The variable-mode digital logic circuit comprises: a plurality of parallel data traces for receiving the parallel data word, where each trace is dedicated to the transmission of a single bit of the parallel data word; a plurality of select-capable multiplexor circuits for sequentially activating certain ones of the parallel data traces and for multiplexing each bit of the parallel data word, such that the parallel data word is serially output therefrom; a ring counter for controlling the frequency of specific operations performed within the digital logic circuit; and at least one additional multiplexor circuit array for receiving the data output from the plurality of select-capable multiplexor circuits and for further serializing the received data for output on a single one-bit wide trace. The digital circuit may be adapted to operate according to one of a plurality of variable modes, wherein during processing according to a selected mode, more than one multiplexing phase is employed at a lower frequency than the frequency assigned to a subsequent multiplexing phase, the frequencies proportional to each other and to the final output frequency.

In a preferred embodiment, the digital logic circuit is implemented as a single integrated circuit. In this aspect, each of the plurality of variable modes defines circuit operation according to a specific number of bits in the parallel data word. In one aspect, the data output on the single one-bit wide trace, after all processing within the circuit is complete, comprises one bit wide serial data. In this aspect, the number of select-capable multiplexor circuits provided therein is directly proportional to the number of parallel data traces entering the digital logic circuit. In one aspect, one of the variable modes may be used for processing a 16-bit wide parallel data word. In another aspect, one of the variable modes may be used for processing a 20-bit wide parallel data word. In all aspects, the data output from the digital logic circuit is clocked at a maximum clock frequency; the ring counter divides the maximum clock frequency according to the number of multiplexing phases included within the digital logic circuit, such that each multiplexing phase operates at ½ the frequency of the next multiplexing phase.

In a variable-mode digital logic circuit for serializing parallel data transmitted thereto, a select-capable multiplexor circuit is provided for receiving a divided portion of a parallel data word, and serializing the received portion, so that the serialized portion of the parallel data word can be output as a one bit wide serial portion of the parallel data word. The select-capable multiplexor circuit comprises: a plurality of parallel data traces, the number of traces equaling the number of bits within the divided portion of the parallel data word; a plurality of data registers, the number of registers equaling the number of parallel data traces; a plurality of select lines for effecting selection of individual ones of the parallel data traces; and a plurality of secondary multiplexing circuits. In one aspect, the secondary circuits may be provided within the select-capable multiplexor circuit for performing further multiplexing operations resulting in serial data transmission of the divided portion of the parallel data word on a single trace. The further multiplexing operations may be characterized in that, according to a specific combination of voltage states applied to the plurality of select lines, individual ones of the plurality of parallel data traces are selected for passing a bit of data for multiplexing within the select-capable multiplexor circuit.

In a preferred embodiment, the select-capable multiplexor circuit has at least two operational modes, and the divided portion of the parallel data word associated with the selected operational mode comprises a preset number of bits.

In another aspect of the present invention, a method is provided for reducing the power requirements of a parallel-in-serial-out conversion process, which outputs serial data at a set high frequency. The method comprises steps of: (a) multiplexing all parallel bits of an incoming parallel data word to reduce a bit width of the parallel data word to ½ of its incoming width; (b) dividing the set high frequency by a number of multiplexing phases associated with the process and clocking out the multiplexed data of step (a) at the divided frequency; (c) multiplexing the results of step (a) in a second multiplexing phase to reduce the bit width of those results by ½; (d) clocking the output results of step (c) at a frequency double that of the frequency used in step (b); and (e) repeating the processes represented in steps (c) and (d) until the original parallel data word is reduced to a serial data word, which is one-bit wide and clocked out at the set high frequency.

In one embodiment, the method is practiced on a single integrated circuit. In another embodiment, the method is practiced between more than one integrated circuit. In one aspect, the integrated circuit hosting the method has more than one operating mode for processing more than one width (measured in bits) of a parallel data word.

In one aspect, the circuitry supporting the method described in steps (a) and (b) is implemented as CMOS logic, and the circuitry supporting the method described in step (e) is implemented as Current Mode Logic (CML).

Now, for the first time, a method is provided for reducing overall power requirements of a PISO converter, while maintaining a high clock-rate for gating out serial data from a parallel data source.

BRIEF DESCRIPTION OF THE DRAWING FIGURES

DESCRIPTION OF THE PREFERRED EMBODIMENTS

Figure 1:
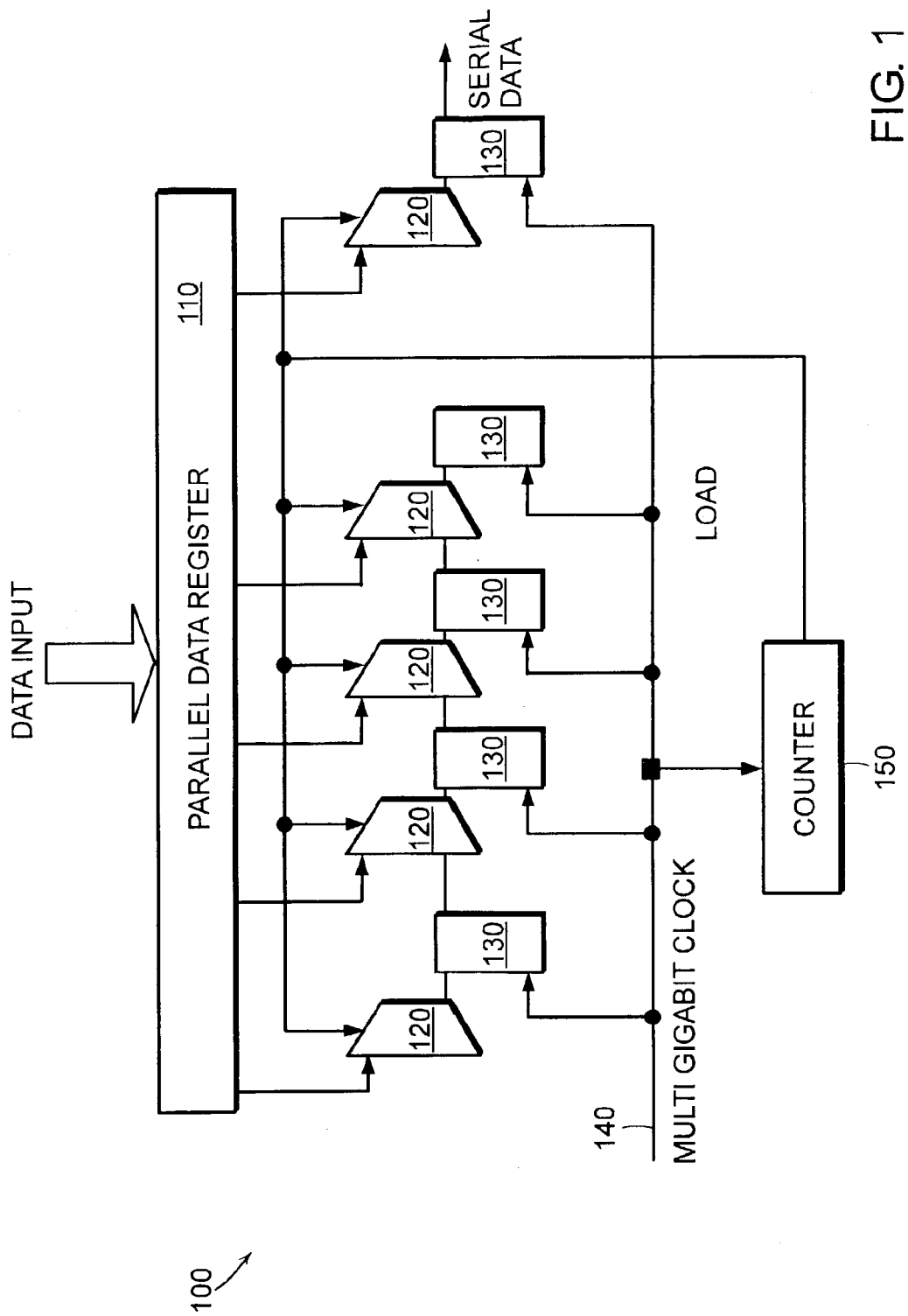
FIG. 1 is a circuitry diagram illustrating a basic PISO converter according to prior art.

FIG. 1 is a circuit diagram illustrating a basic Parallel-in-to-Serial-Out (PISO) converter 100 according to prior art.

In this prior art example, digital data input is loaded into a Parallel Data Register 110 represented in this diagram by a rectangular block labeled so. Actual data input is illustrated herein by a block arrow labeled "Data Input" proceeding into the Parallel Data Register. Output from the Parallel Data register is illustrated by a plurality of exit arrows or traces extending in parallel from the register 110. Though only 5 traces are illustrated in this example of PISO 100, the number of traces will depend on the size of the input word being processed. For example, in a 16-bit process there are 16 such traces, each trace carrying one bit.

A plurality of multiplexor (mux) circuits 120 are illustrated beneath Parallel Data Register 110 as is known in the art. Each mux circuit is dedicated to a single data path emanating from the register. Therefore, 5 muxes are illustrated in the current example. Each mux is also associated with a shift register 130, which may be otherwise referred to as a load register, or a flipflop, as is known in the art. A multi-Gigabit clock line 140 controls the frequency at which data is clocked out of flip-flop registers 130. Connection from clock line 140 to each flip-flop register is illustrated by directional arrows.

Operation of the prior art circuit (PSO 100) represented in this example is well known in the art. When parallel data is input into PISO 100, it is loaded into the Parallel Data Register 110 as one N-bit word, where "N" is the number of bits in the word. The word is divided by the clock signal into its individual bits (1 or 0), and each bit is muxed and loaded into an associated flip flop during the process of converting the data into, for example, a 1 bit wide serial data stream which is N bits long. A Counter 150, comprising phase detection and adjustment circuitry, is provided to control the circuit operation as is known in the art. It is important to note that the clock frequency at which data is clocked out from each register or flip flop of PISO 100 must be much higher than the input clock frequency at which the input data is received before the conversion process begins.

As one disadvantage, the prior art concept illustrated in FIG. 1 requires all parts of the digital logic circuit to run at full (maximum) clock speed. In addition, the parallel to serial data conversion performed by PISO 100 is undesirably time-constrained, since the parallel data must be loaded after the last bit of the current data byte, and before the first bit of the next data byte, in the serial stream. When the parallel data received by PISO 100 is expressed in large words, the order of frequency desired for serializing the parallel data is approximately 2.5 gigabits per second (GB/s). In a 2.5 gigabit per second (GB/s) PISO, however, the window for the load function is only 4 nanoseconds (Ns), minus the setup and hold times for the flip-flop registers. Maximum power is, therefore, required in order for all processing to be performed correctly (including streaming out of the serial data). Such power requirements can be excessive for converters processing large bitwords, thereby causing shorter life and overheating of the digital logic circuits.

Figure 2:
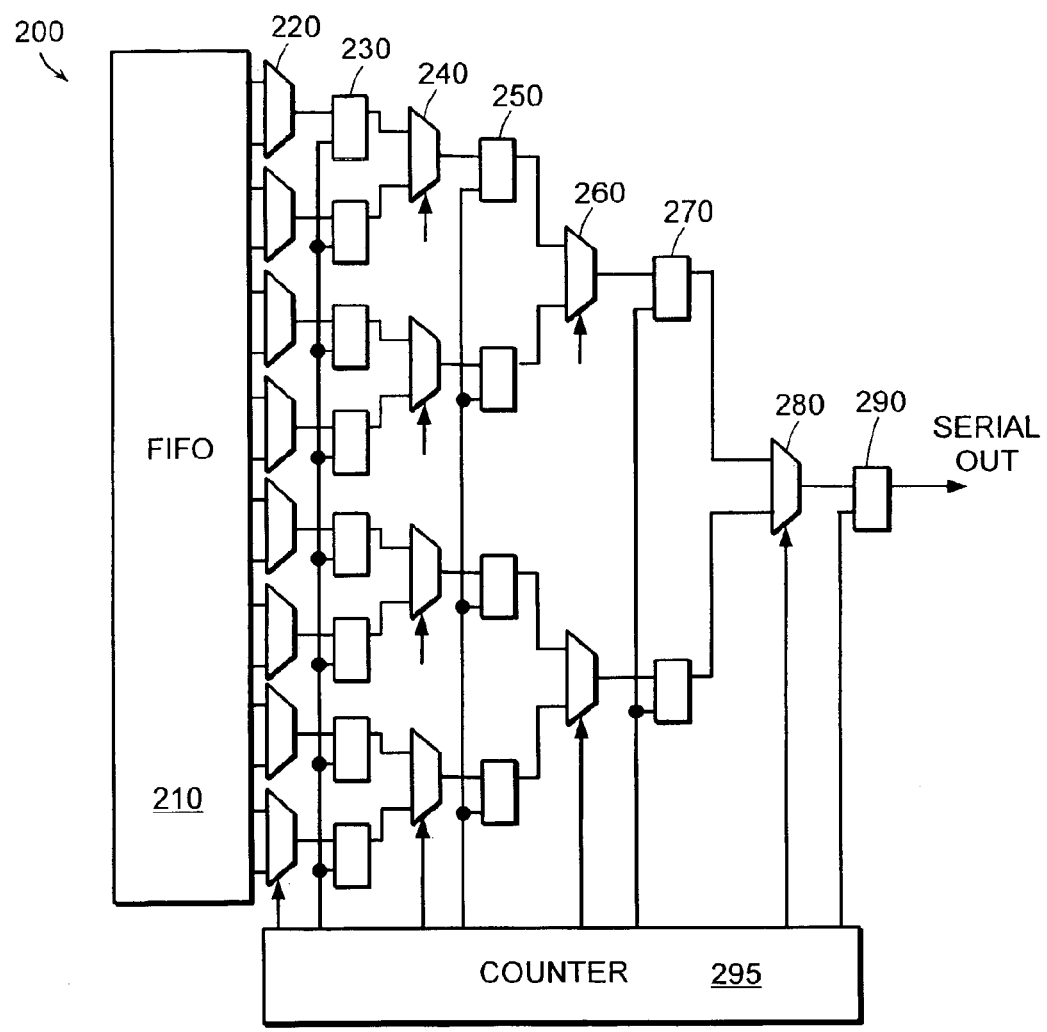
FIG. 2 is a circuitry diagram illustrating a basic PISO converter according to an embodiment of the present invention.

FIG. 2 is a circuit diagram illustrating a PISO converter 200 according to an embodiment of the present invention. The primary objective in this embodiment is to reduce the power needed to accomplish the parallel to serial data conversion. In the example of FIG. 2, PISO 200 uses essentially the same logic devices (but more in number) as the PISO 100 described in FIG. 1. In this example, it is also assumed that PISO 200 processes 16-bit data words. A First In First Out (FIFO) Data register 210 is provided, within PISO converter 200 and adapted to accept, in this example, 16-bit wide data words in accordance with FIFO protocol. The FIFO register of this example is analogous to the Parallel Data Register of FIG. 1.

In this embodiment, each 16-bit parallel data word is processed in divisive stages. In a first stage, for example, a 16-bit word is muxed and registered as an 8-bit wide parallel word by sending 2 bits of the word into each of the eight muxes 220 and eight flip flop registers 230 illustrated in the first stage. Each of the eight muxes has two input lines leading thereto from the FIFO register. In this example, we may also assume that parallel data coming into PISO 200 arrives at an input clock of 156 Mega Bits per second (Mb/s). In such an example, the frequency of the first stage is clocked at 312 Mb/s, or double the input frequency.

A second stage is provided for muxing and loading the 8-bit wide parallel word into a 4-bit wide word at a frequency of 625 Mb/s. In the embodiment of FIG. 2, the second stage includes muxing circuits 240 and four associated flip flop registers 250. It is noted herein that the first two stages described thus far can be implemented with standard Complementary Metal Oxide Semiconductor (CMOS) logic, which requires less direct current for operation than Current Mode Logic (CML). For example, if lower clock frequencies are used in the first two stages of PISO 200, CMOS cells may be used in the first two stages, thereby contributing to a partial power reduction over the entire circuit. However, a serial speed of 2.5 Gb/s, which was described above as a desired rate for conversion in the PISO 100 of FIG. 1, may require the first two stages to be implemented with CML logic cells.

A third muxing stage is provided that further condenses the 4-bit word into a 2-bit word. This stage is illustrated in FIG. 2 by two muxing circuits 260 and associated flip flop registers 270. The clock frequency used at the third stage is 1.25 Gb/s, or double the frequency of the previous 4-bit stage. In some cases, the third stage may be implemented with CML, as previously described. A final stage of muxing condenses the 2-bit wide word into a serial (1-bit wide) word at 2.5Gb/s. This stage, which includes mux 280 and flip flop 290, may also be implemented with CML. Since only one mux and one register comprise the final muxing stage, the final result is a 16-bit long data word that is 1-bit wide and traveling on one line.

In the exemplary circuit of FIG. 2, a 16-bit wide word is input at a rate of 156 megabits per second (Mb/s). The first stage of conversion produces 8-bit wide data at 312 Mb/s. The second stage of conversion produces 4-bit wide data at 625 Mb/s. The third stage of conversion produces 2-bit wide data at 1.25 Gb/s, and the last stage combines and outputs the data in serial form at 2.5 Gb/s. In some cases, the functionality described in this embodiment may be implemented in standard CMOS process technology of a quarter micron or better. In other cases, the first two stages are implemented with standard CMOS logic cells, while the subsequent two stages are implemented with CML-type logic.

Due to its' lower operating speed, the first of the two CML stages may have a lower supply current setting than the final stage, which operates at full clock speed. This allowance further reduces the overall power requirement of the digital logic circuit. The counter (295) shown in FIG. 2 uses known Grey code technology to ensure that no two muxing phases change at the same time. This fact allows for a reduction in re-timing elements associated with the separate muxing stages.

One with skill in the art will appreciate that the tree implementation of divisive muxing stages illustrated in this example requires more circuitry to be added to a chip. However, the power reduction achieved by such implementation more than offsets the disadvantage of added circuit components.

Figure 3:
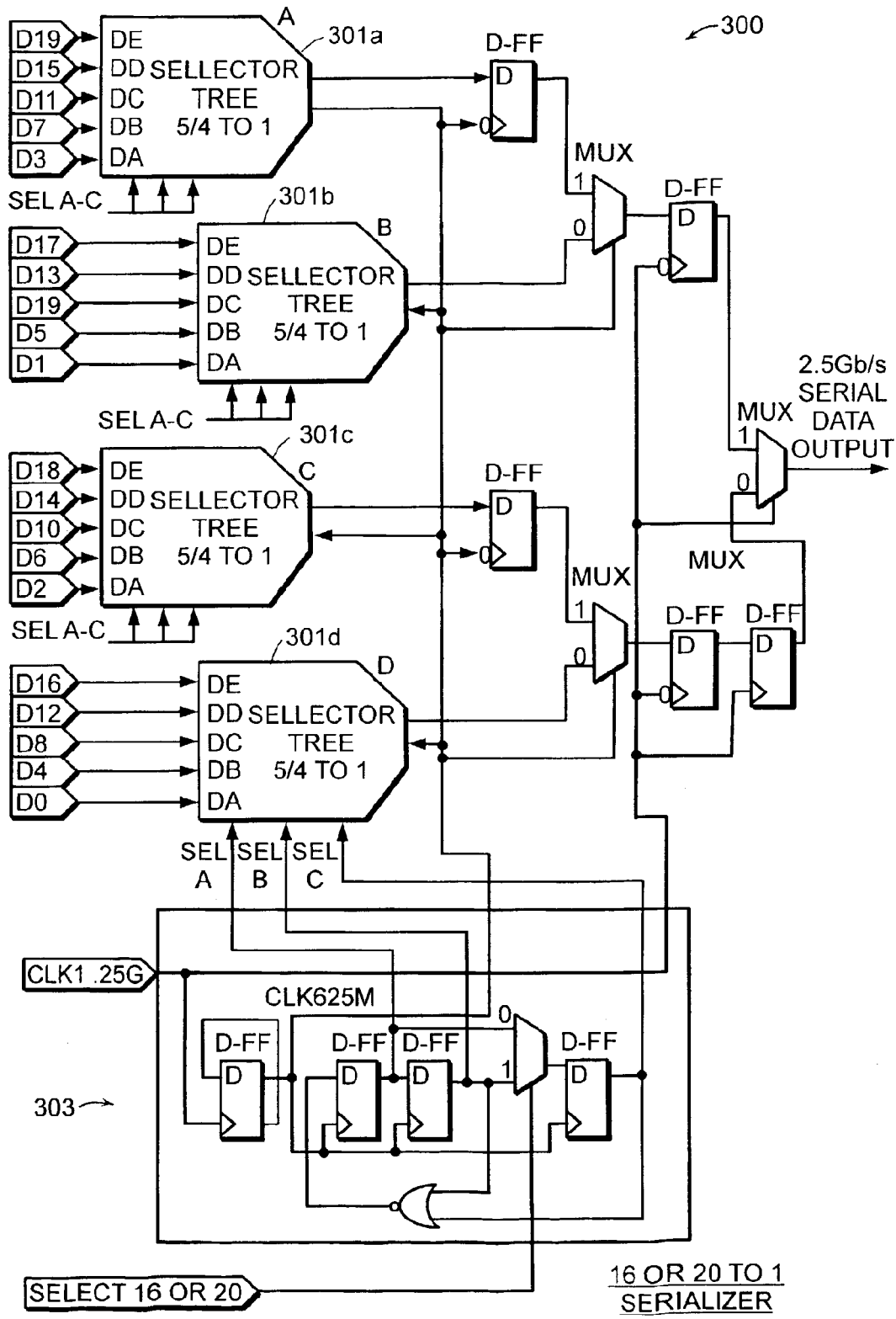
FIG. 3 is a more detailed circuitry diagram illustrating a 16 (or 20) to 1 PISO converter according to an embodiment of the present invention.

FIG. 3 is an exemplary circuit diagram of a dual mode 16 (or 20) to 1 PISO serializer 300, according to another embodiment of the present invention. PISO serializer 300 utilizes four selector trees 301a–d, each labeled "Selector Tree 5/4 to 1". In some cases, each of selector trees 301a–d may be capable of receiving and muxing 5 data inputs. Alternatively, selector trees 301a–d may each be set to mux only 4 of the 5 inputs available to each tree. Data inputs are illustrated to the left of each tree and are collectively labeled D0–D19 in a prioritized fashion. Serializer 300 uses selector trees 301a–d for processing either 4 inputs per tree to accommodate a 16-bit word, or 5 inputs per tree to accommodate a 20-bit word.

There are three select lines illustrated in the exemplary circuit of FIG. 3. The select lines are labeled Sel A, Sel B, and Sel C. Sel C is always used to trigger data inputs into selector trees 301a–d. A ring counter 303 clocked at 1.25 GHz controls the select lines A–C. This embodiment allows two modes of operation as previously described, a 16-bit mode and a 20-bit mode. In the 16-bit mode, selector trees 301a–d operate in a 4:1 conversion functionality that systematically selects inputs from pins DA, DB, DC, and DD. However, the input DE is never selected in the 16-bit mode of operation. In the 20-bit mode, selector trees 301a–d operate in a 5:1 conversion functionality that systematically selects inputs from all five data pins (DA, DB, DC, DD and DE). When operating in either mode, selector trees 301a–d may send their outputs through two additional stages of multiplexing and flip-flop conversion. The clock frequency is doubled at each additional stage to finally output the data in serial format at 2.5 Gb/s. For example, inputs leaving selector trees 301a–d and entering a first additional stage may be clocked at 625 Mb/s. Outputs leaving the first additional stage may be input into a second additional stage at 1.25 Gb/s. Finally, the serial output of serializer 300 may be clocked out of the second additional stage at 2.5Gb/s. A select line labeled "Select 16 or 20" is provided and illustrated as leading into a mux within counter 303. This line is used for selecting either a 16-bit mode or a 20-bit mode of operation for serializer 300. A granular description of a single one of selector trees 301a–d is provided below.

One with skill in the art will recognize that overall power requirements may be further reduced (beyond the reduction described with reference to FIG. 2) by implementing the select function only at 1.25 GHz, and by the fact that the clock frequency is halved and then doubled during the remaining CML muxing phases before final serial output. Empirical simulation methods for simulating function and requirements of serializer 300 show a power reduction of 50% over a prior-art circuit.

Figure 4:
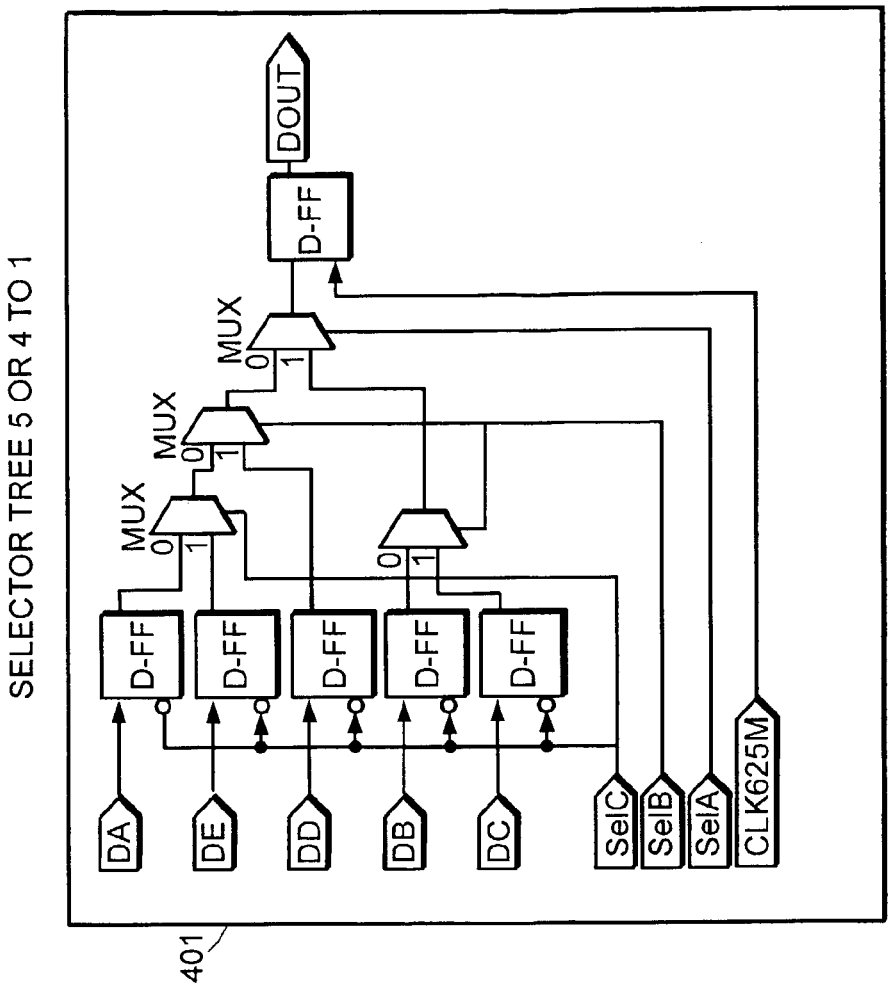
FIG. 4 is a circuitry diagram illustrating a single selector tree of the converter of FIG. 3, including a table illustrating input select functions according to an embodiment of the present invention.

FIG. 4 includes a detailed circuit diagram illustrating the functionality of a single selector tree 401, and an associated table 400 illustrating the select function of tree 401 according to an embodiment of the present invention. In the example of FIG. 4, data inputs (DA-DE) are clocked into selector tree 401 at either the rising or falling edge of the Sel C waveform at a 1.25 GHz frequency. The data is then processed as described above in FIG. 2, and clocked out of selector tree 401 as serial data according to a 625 MHz frequency clock. It is noted herein that in the 16-bit mode, DE is never selected.

Referring now to table 400, it is noted that when Sel A—C are all low or logic (0), the DA input is latched and processed to generate output data DOUT, as illustrated in selector tree 401. When Sel A is high or logic (1) and Sel B—C are low, the DB input is latched and processed to DOUT. When Sel A–B are high and Sel C is low, the DC input is latched and processed to DOUT. When Sel A is low and Sel B–C are high, the DD input is latched and processed to DOUT. In a 20-bit mode, the last line of table 400 applies, such that when Sel A–B are low and Sel C is high, the DE input is latched and processed to DOUT. It is noted that in selector tree 401, DOUT is the serial format of the 4(16-bit) or 5(20-bit) data inputs charged to a single tree.

Figure 5:
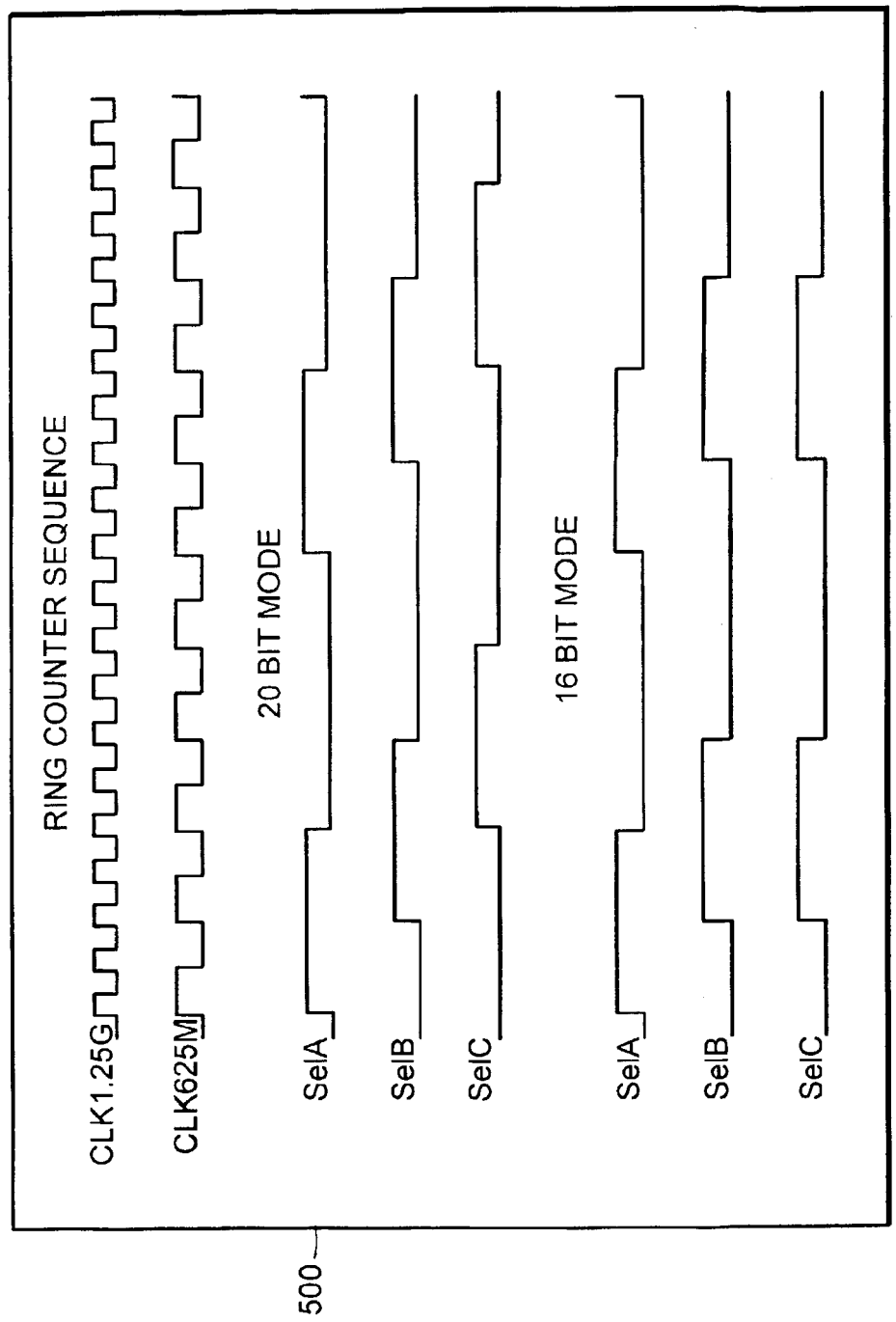
FIG. 5 is a waveform chart illustrating a clock divide sequence for both a 20 bit mode and a 16 bit mode according to an embodiment of the present invention.

FIG. 5 is a waveform chart illustrating a clock-divide sequence for both a 20-bit operating mode and a 16-bit operating mode for the serializer 300 of FIG. 4 according to an embodiment of the present invention. The 1.25 GHz input clock frequency is first divided by 2 to produce a 625 MHz carrier. The input clock frequency may then be further divided by 4 to produce the 312 MHz carrier for the 16-bit operational mode (not illustrated here), or by 5 to produce the 250 MHz carrier for the 20-bit operational mode (not illustrated here). The functionality of the 20-bit mode and 16-bit mode operation is illustrated by the clock sequences for triggers Sel A, Sel B, and Sel C. It is noted that in the 16-bit mode, both Sel B and Sel C are aligned because there is no selection of DE illustrated in tree 401 of FIG. 4.

It will be apparent to one with skill in the art that the present invention may be practiced in variations of the presented configurations without departing from the spirit and scope of the present invention. The inventor has provided actual diagrammatic representations of the logical devices, integrated circuit design and process concept, and waveform charts for generating the clock carriers and sequence, and deems them sufficient for illustrative purposes. Therefore, the inclusion of such devices, design, process, and waveform charts in this example should not be construed as a limitation in any way to the practice of the present invention. Furthermore, the circuitry described herein, although preferably implemented on a single VLSI device, may be shared by more than one device without departing from the spirit and scope of the present invention. Therefore, the method of the present invention should be afforded the broadest possible scope under examination. The spirit and scope of the present invention is limited only by the claims that follow.

What is claimed is:

1. A variable-mode digital logic circuit for accepting a parallel data word as input, the parallel data word being a plurality of data bits wide, and serializing the parallel data word, such that the parallel data word is transmitted as output from the digital logic circuit over as few as a single one-bit wide trace, wherein the digital logic circuit comprises:

a plurality of parallel data traces for receiving the parallel data word, each trace dedicated to the transmission of a single bit of the parallel date word;

a plurality of select-capable multiplexor circuits for sequentially activating certain ones of the parallel data traces and for multiplexing the each bit of the parallel data word, such that the parallel data word is serially output therefrom;

a ring counter for controlling a frequency of specific operations performed within the digital logic circuit; and at least one additional multiplexor circuit array for receiving the data output from the plurality of select-capable multiplexor circuits, and for further serializing the received data for output on the single one-bit wide trace; and wherein the digital logic circuit is adapted to operate according to one of a plurality of variable modes wherein, and wherein during processing according to a selected mode, more than one multiplexing phase is employed at a lower frequency than a frequency assigned to a subsequent multiplexing phase, the lower frequency and the assigned frequency are proportional to each other and to a final output frequency.

2. The variable-mode digital logic circuit of claim 1, wherein the digital logic circuit is implemented as a single integrated circuit.

3. The variable-mode digital logic circuit of claim 2, wherein the plurality of variable modes is performed within the digital logic circuit for processing more than one width, measured in bits, of the parallel data word.

4. The variable-mode digital logic circuit of claim 3, wherein the output on the single one-bit wide trace, after all processing within the digital circuit is complete, is one bit wide serial data.

5. The variable-mode digital logic circuit of claim 4, wherein the number of the select-capable multiplexer circuits is directly proportional to the number of the parallel data traces entering the digital logic circuit.

6. The variable-mode digital logic circuit of claim 3, wherein one of the plurality of variable modes is configured for processing a 16-bit wide parallel data word.

7. The variable-mode digital logic circuit of claim 3, wherein one of the plurality of variable modes is configured for processing a 20-bit wide parallel data word.

8. The variable-mode digital logic circuit of claim 7, wherein the plurality of select-capable multiplexor circuits and the at least one additional multiplexor circuit array comprise a number of multiplexing phases arranged in a tree configuration, such that data output from a preceding multiplexing phase is input to a subsequent multiplexing phase.

9. The variable-mode digital logic circuit of claim 8, wherein the data output on the single one-bit wide trace is clocked at a maximum clock frequency, and wherein the ring counter is adapted to divides the maximum clock frequency according to the number of multiplexing phases included within the digital logic circuit, such that each multiplexing phase operates at ½ the frequency of the subsequent multiplexing phase.

10. The variable-mode digital logic circuit of claim 1, wherein the digital logic circuit is implemented on more than one integrated circuit.

11. The variable-mode digital logic circuit of claim 1, wherein the digital logic circuit is implemented with CMOS logic.

12. The variable-mode digital logic circuit of claim 1, wherein the digital logic circuit is implemented with Current Mode Logic (CML).

13. In a variable-mode digital logic circuit for serializing a parallel data word transmitted thereto, a select-capable multiplexor circuit for receiving a divided portion of the parallel data word and for serializing the divided portion, such that the divided portion of the parallel data word is output as a one bit wide serial data stream, wherein the select-capable multiplexor circuit comprises:

a plurality of parallel data traces, the number of traces equaling a number of bits within the divided portion of the parallel data word;

a plurality of data registers, the number of data registers equaling the number of parallel data traces;

a plurality of select lines for effecting selection of individual ones of the parallel data traces; and a plurality of secondary multiplexing circuits for performing further multiplexing operations resulting in serial data transmission of the portion on a single trace, characterized in that according to a specific combination of voltage states applied to the plurality of select lines, individual ones of the plurality of parallel data traces are selected for passing a single bit of data for multiplexing within the select-capable multiplexor circuit.

14. The select-capable multiplexor circuit of claim 13, wherein the select-capable multiplexor circuit is configured for having at least two operational modes, and wherein the divided portion of the parallel data word comprises a preset number of bits associated with the a selected one of the at least two operational modes.

* * * * *

UNITED STATES PATENT AND TRADEMARK OFFICE
CERTIFICATE OF CORRECTION

PATENT NO. : 6,977,981 B2
APPLICATION NO. : 09/791187
DATED : December 20, 2005
INVENTOR(S) : Measor It is certified that error appears in the above-identified patent and that said Letters Patent is hereby corrected as shown below:

On the Title Page:

(74) Attorney, Agent, or Firm -- please delete "Kevin J. Daffer" and substitute therefor --Kevin L. Daffer--.

In the Claims:

Col. 9, line 15: after the phrase "wherein the", please insert --data--.

Col. 10, line 27: after the phrase "data transmission of the", pleae insert --divided--.

Signed and Sealed this

Nineteenth Day of September, 2006

JON W. DUDAS
*Director of the United States Patent and Trademark Office*